:::note

:::

(12) United States Patent
van Rietschote et al.

(10) Patent No.: US 7,383,465 B1
(45) Date of Patent: Jun. 3, 2008

(54) UNDOABLE VOLUME USING WRITE LOGGING

(75) Inventors: Hans F. van Rietschote, Sunnyvale, CA (US); Evan L. Marcus, Fair Lawn, NJ (US); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 695 days.

(21) Appl. No.: 10/873,844

(22) Filed: Jun. 22, 2004

(51) Int. Cl.
*G06F 11/00* (2006.01)
(52) U.S. Cl. .............................. 714/13; 714/6; 714/15; 714/16; 714/20
(58) Field of Classification Search ............ 714/6, 714/13, 15, 16, 20
See application file for complete search history.

(56) References Cited

U.S. PATENT DOCUMENTS

| | | | |
|---|---|---|---|
| 7,111,136 B2* | 9/2006 | Yamagami | 711/162 |
| 7,152,183 B2* | 12/2006 | Fujibayashi | 714/6 |
| 2002/0078244 A1 | 6/2002 | Howard | |
| 2005/0015416 A1* | 1/2005 | Yamagami | 707/204 |
| 2005/0028022 A1* | 2/2005 | Amano | 714/2 |
| 2005/0223267 A1* | 10/2005 | Fujibayashi | 714/6 |

OTHER PUBLICATIONS

Gray et al., *Transaction Processing: Concepts and Techniques*, © 1993 Morgan Kaufmann Publishers, Inc., pp. 5-7.
Best, S., "JFS Log. How the Journaled File System Performs Logging," Proceedings of the 4th Annual Linux Showcase and Conference,—Oct. 10, 2000, XP-002231204, 6 pages.
"VERITAS File System Performance," © 1996 VERITAS Software Corp., 1-41.
"File System Performance," © 1996 VERITAS Software Corp., pp. 1-17.
"File System," © VERITAS Software Corp., pp. 1-17.
Gray, J. et al., "Transaction Processing: Concepts and Techniques," 1994, Morgan Kaufman Publishers, Inc., XP-002231205, 5 pages.
"Implementing VERITAS Flashsnap™ in the Sybase Ase 12.5 Environment," VERITAS Database Edition® for Sybase and VERITAS FlashSnap™, White Paper, 2002, pp. 3-13.
"Network Appliance™ Snapshot™ Technology," Storage Solutions, Network Appliance, Inc., 2004, 1 page.
"Unique Benefits and Competitive Advantages of Netapp Snapshot™ Technology," Enterprise Storage Solutions, Network Appliance, Inc., 2004, 4 pages.

* cited by examiner

*Primary Examiner*—Robert W Beausoliel, Jr.
*Assistant Examiner*—Charles Ehne
(74) *Attorney, Agent, or Firm*—Lawrence J. Merkel; Meyertons, Hood, Kivlin, Kowert & Goetzel, P.C.

(57) ABSTRACT

In one embodiment, a method is contemplated. The method includes creating a copy of a volume, wherein the copy corresponds to a first point in time. Write operations to the volume are logged separate from the volume. The method also includes recovering a state of the volume to a second point in time subsequent to the first point in time using the copy of the volume from the first point in time and at least a subset of the write operations from the log. The subset of write operations occurs subsequent to the first point in time and prior to the second point in time. In some embodiments, an end marker may be included in the log, and recovery to a write operation that is indicated as the end of a transaction (by the end marker) may be performed.

27 Claims, 8 Drawing Sheets

UNDOABLE VOLUME USING WRITE LOGGING

BACKGROUND

1. Field of the Invention

This invention is related to the field of volume management on storage devices and, more particularly, to recovering a previous state of a volume.

2. Description of the Related Art

Computer systems have been responsible for large productivity increases, as well as providing new and exciting functionality for users to experience in both work and leisure capacities. Crucial to the usefulness and functionality of computer systems is the computer data that is stored on various storage devices within, or accessible to, the systems. Computer data (or simply "data") is being used to refer generically to data manipulated by the computer systems and instructions (e.g. software) executed by the computer systems.

Computer data can be corrupted or otherwise lost in a variety of fashions. For example, user error is frequently a source of corruption/data loss. Computer systems are particularly sensitive to errors made by users having administrative privileges (often referred to as "administrators") because such users can change important computer system configuration, including operating system configuration, that the computer system relies on for operation. Other sources of data corruption/loss may include hardware or software failures in one or more computer systems; malicious operation such as viruses, worms, "hacker" intrusions, etc.; environmental events such as power failures, accident, natural disaster, intentionally-caused disaster, etc.

To protect against data corruption/loss, various data protection mechanisms have been employed. For example, data backup, replication, and snapshot mechanisms are often used (either at the filesystem level or the logical volume level) to make a copy of the data that corresponds to a given point in time. However, the data protection mechanisms are costly, both in terms of physical resources consumed and the elapsed time to implement the copying. A given copy becomes out of date almost immediately (because original data continues being changed by the computer system). Due to the cost and time constraints, immediately making another copy using the above mechanisms is not feasible.

The VERITAS Volume Manager™ (VxVM) available from VERITAS Software Corporation (Mountain View, Calif.) implements a flexible snapshotting feature called FlashSnap. If a mirrored volume is created (that is, a volume that spans at least two physical storage devices and a copy of each datum in the volume is stored on each of the physical storage devices), a physical storage device may be "broken off" (disconnected from the volume) to permit a backup copy to be made (e.g. a snapshot). The break off can also happen involuntarily due to a software or hardware failure that makes said storage device inaccessible for a period of time. While the physical storage device is broken off, FlashSnap keeps a scoreboard of write operations to the mirrored volume at a selectable level of granularity (some multiple of the block size). Granularities may be, e.g., 64 kilobytes or 1 Megabyte. After the physical storage device is reattached, the write operations are applied to the physical storage device to sync its state to the state of the volume.

SUMMARY

In some embodiments, a snapshot of a volume (corresponding to a first point in time) may be made. In such embodiments, a volume manager may log write operations to the volume, along with an indication of the time at which the write operations occur (e.g. the indication of time may be a time stamp). The logged write operations may be stored in a log that is logically separate from the volume, in some implementations. The state of the volume may be recovered to the state existing at a second point in time later than the first point using the snapshot and the logged write operations. For example, the volume may be synced to the snapshot and then the volume may be updated with logged write operations that occur between the first point in time and the second point in time. In some cases, an end marker may be included in the log entries, and recovery may be performed to a point in time that corresponds to a write operation indicated (by the end marker) as the end of a transaction to ensure a consistent state of the volume.

In one embodiment, a method is contemplated. The method includes creating a copy of a volume, wherein the copy corresponds to a first point in time. Write operations to the volume are logged separate from the volume. The method also includes recovering a state of the volume to a second point in time subsequent to the first point in time using the copy of the volume from the first point in time and at least a subset of the write operations from the log. The subset of write operations occurs subsequent to the first point in time and prior to the second point in time. A computer accessible medium comprising software which implements the method, and a computer system executing the software, are also contemplated.

In another embodiment, a method is contemplated. The method includes creating a plurality of copies of a volume, each copy corresponding to a respective point in time of a plurality of points in time. The method further includes logging write operations to the volume in a log separate from the volume. The method further includes recovering a state of the volume to a first point in time using a first copy of the plurality of copies and at least a subset of the write operations from the log. The first copy is a most recent previous copy of the volume relative to the first point in time, and the subset of write operations occur subsequent to a second point in time corresponding to the first copy and occur prior to the first point in time. A computer accessible medium comprising software which implements the method, and a computer system executing the software, are also contemplated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
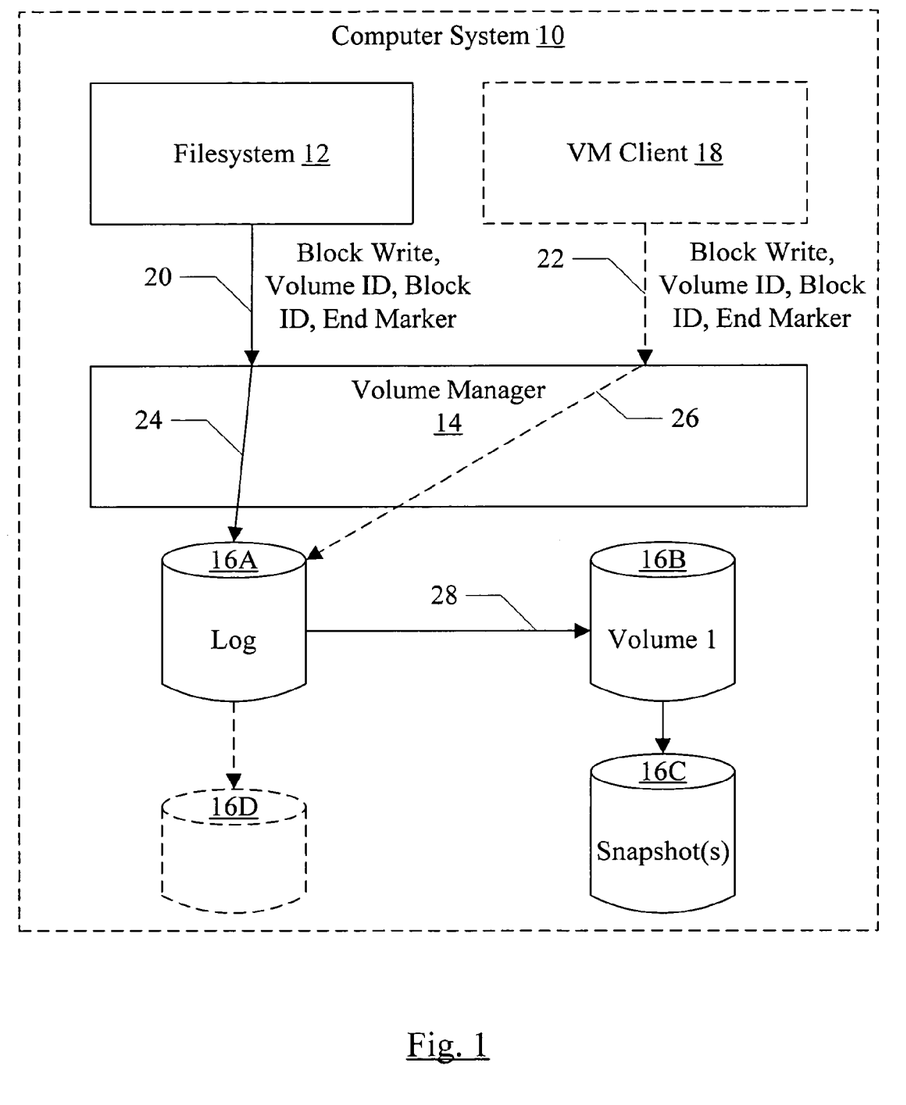
FIG. 1 is a block diagram of one embodiment of a computer system.

Turning now to FIG. 1, a block diagram of one embodiment of a computer system 10 is shown. In the illustrated embodiment, the computer system 10 includes a filesystem 12, a volume manager 14, and a set of storage devices 16A-16D. The illustrated embodiment may also include any other volume manager (VM) client 18.

Generally, the filesystem 12 is responsible for the logical organization of files, and for allocating the files onto volumes. For example, the filesystem 12 may provide a hierarchical directory structure for organizing files, and may map the directory structure (and files therein) onto one or more volumes. The filesystem 12, when allocating storage for files and metadata (e.g. data describing directory structures, files, permissions for files and/or directories, etc.), requests storage space from the volume manager 14 (from a specified volume) and allocates the storage space to the files and metadata. In some embodiments, applications other than a filesystem, such as databases and other applications that can use block storage directly, may take the place of the filesystem 12.

The volume manager 14 is generally responsible for creating and managing the volumes on the storage devices 16A-16D. Additionally, volumes may have various attributes (e.g. mirroring to multiple storage devices, striping across multiple storage devices, various redundancy attributes such as redundant arrays of inexpensive disks (RAID), etc.), and the volume manager 14 may be responsible for ensuring that the volumes have the desired attributes.

The volume manager 14 may support an application programming interface (API) that may be used by the filesystem 12 to communicate with the volume manager 14. The API may include requests to allocate storage on a volume, write operations to update blocks on the volume, operations to free storage that is no longer in use, etc. The term "block" may generally refer to the minimum unit of contiguous storage space for allocation and update. In some cases, groups of contiguous blocks ("extents") may be allocated in response to allocation requests, but at least one block is allocated in response to a given request and, if more than a block as allocated, an integral number of blocks are allocated. Additionally, write operations update one or more complete blocks. Even if the actual data changed is less than a full block, the data comprising the entire block, as updated, is written. For example, a typical block size may be 512 bytes for many storage devices. However, larger or smaller block sizes may be used in other embodiments. For example, in some cases, a 256 byte block size may be used. There may be a trend toward larger block sizes going forward (e.g. larger block sizes may be more likely in the future).

For example, in the illustrated embodiment, the API may include a block write operation (illustrated by the arrow 20 from the filesystem 12 to the volume manger 14). As used herein, a "block write operation" may be an operation to write a block of data to a volume. If multiple blocks are to be written, the filesystem 12 may generate multiple block write operations. Alternatively, the API may support an operation which provides multiple blocks to be written, which the volume manager 14 may internally divide into several block write operations. The filesystem 12 may generate block write operations to store file data and/or metadata to blocks on a volume that were previously allocated by the volume manager 14 to the filesystem 12 (responsive to allocation requests from the filesystem 12).

While the filesystem 12 may use the API to the volume manager 14 to allocate file data and metadata to volumes, other software may also use the API (e.g. the VM client 18). For example, some database software interacts directly with the raw volumes for storing database data (both tables of database data and transaction data). The VM client 18 may similarly provide block write operations via the API (arrow 22 in FIG. 1).

A block write operation may include the block of write data, a volume identifier (ID) that identifies the volume (since the volume manager 14 may manage multiple volumes, not shown in FIG. 1), and may also include a block ID that locates the block with the identified volume (e.g. a block address). In some embodiments, the block write operation may also include an end marker, which may indicate whether a given block write operation completes a logical group of block write operations. For example, the filesystem 12 may use the end marker to indicate a block write operation which completes a metadata update corresponding to a file update. When the metadata update is complete, the filesystem may be in a consistent state. As another example, a database system (e.g. a VM client 18) may use the end marker to indicate that the block write operation completes a database transaction (e.g. the transaction is being committed).

The volume manager 14 may record the block write operations in a log (e.g. on a storage device 16A, in the present embodiment). The logging of the block write operations is illustrated in FIG. 1 via arrows 24 and 26, respectively. As a background process, the volume manager 14 may update the volume (e.g. volume 1 on the storage device 16B, in the illustrated embodiment) to reflect the block write operations (arrow 28). In some embodiments, the storage device 16A may be a high speed storage that may permit the block write operations to complete quickly (from the point of view of the initiator of the block write operations, such as the filesystem 12 and/or the VM client 18). The blocks in the volume may actually be updated at a later time. For example, if the volume is a mirrored volume, the block may be written to the corresponding location on each of the storage devices included in the mirrored volume. That is, two or more writes may occur to store the block in the mirrored volume. However, the block write operations may still be retained in the log after being written to the volume, for purposes of recovering the volume as described below.

The volume manager 14 may be configured to generate at least one snapshot of a volume, and in some cases may be configured to generate multiple snapshots corresponding to different points in time. The snapshots may be stored, e.g., on the storage device 16C in the illustrated embodiment. While snapshotting is used in the present embodiment, any mechanism for making a copy of a volume may be used (e.g. replication, backup, etc.).

Logging the block write operations and generating one or more snapshots may permit recovery of the volume to a state at virtually any point in time, even if there is not a snapshot of the volume that directly corresponds to the desired point in time. To recover the state of the volume to a different point in time than those represented by the snapshots, the most recent snapshot that precedes the recovery point may be used in combination with the block write operations from the log to restore the state of the volume to the desired point in time. For example, the volume may be synchronized (synced) to the selected snapshot and the block write operations from the log that occur between the point in time corresponding to the selected snapshot and the desired point in time may be applied to the volume after the syncing. The log may include a time stamp for each block write operation to permit identification of the block write operations to be applied to the volume.

In some embodiments, the above functionality may permit recovery in the case of data corruption or loss, even if there is not a copy of the volume that immediately precedes the occurrence of the corruption/loss. Such flexibility may permit recovery from user error, introduction of malicious code, etc.

In some embodiments, it may be desirable to recover the state of the volume to a point in time that: (i) is near the desired point in time; and (ii) corresponds to a logged block write operation having the end marker indicating that the logged block write operation completes a logical group of writes. Recovering in this fashion may, for example, recover the filesystem to a consistent state. In the case of a database operating as a VM client 18, recovering in this fashion may recover the database to the state corresponding to a most recent committed transaction. For example, the end marker may be a flag that indicates that the operation completes the logical group when set and does not indicate that the operation completes the logical group when clear, or vice versa.

In some embodiments, it may be desirable to limit the size of the log on the storage device 16A. Additionally, older logged block write operations (which have been written to the volume) may be less likely to be used for recovery operations. In such embodiments, the log may be periodically "flushed" to another storage device 16D (e.g. a lower speed, less expensive archival storage device) by writing the older logged block write operations to the storage device 16D and cleaning out or purging (e.g. deleting) the older logged block write operations from the log. For example, the storage device 16D may be a tape drive and the older logged block write operations may be written to a tape which may be removed from the computer system 10 and placed in safe storage. If a recovery is initiated that uses the logged block write operations from the storage device 16D, the logged block write operations may be still be retrieved (although, in some embodiments, more time may elapse in performing the recovery). In one embodiment, only block write operations that got committed (fully written) to the volume 16B may be purged from the log 16A and moved to the archival storage device 16D.

Generally, each of the storage devices 16A-16D may comprise any computer-accessible storage and the storage devices 16A-16D need not all be the same type of storage device. For example, the storage devices 16A-16D may comprise fixed disk drives (e.g. small computer systems interface (SCSI) drives, integrated drive electronics (IDE) drives, Fibre channel drives, etc.). The storage devices 16A-16D may also comprise removable storage media such as floppy disks, compact disk (CD)-recordable (R), CD-rewriteable (RW), digital video disk (DVD)-R, DVD-RW, etc. The storage devices 16A-16D may also comprise storage devices coupled via a peripheral interface such as Peripheral Component Interconnect (PCI), Universal Serial Bus (USB), FireWire (or, more formally, Institute of Electrical and Electronic Engineers (IEEE) standard 1394), etc. In some embodiments, one or more of the storage devices 16A-16D may be separate from the computer system (e.g. a storage area network (SAN) or network attached storage (NAS) configuration). The storage devices 16A-16D may also comprise memory within the computer system 10 (e.g. the storage device 16A may be a random access memory (RAM) disk).

Figure 9:
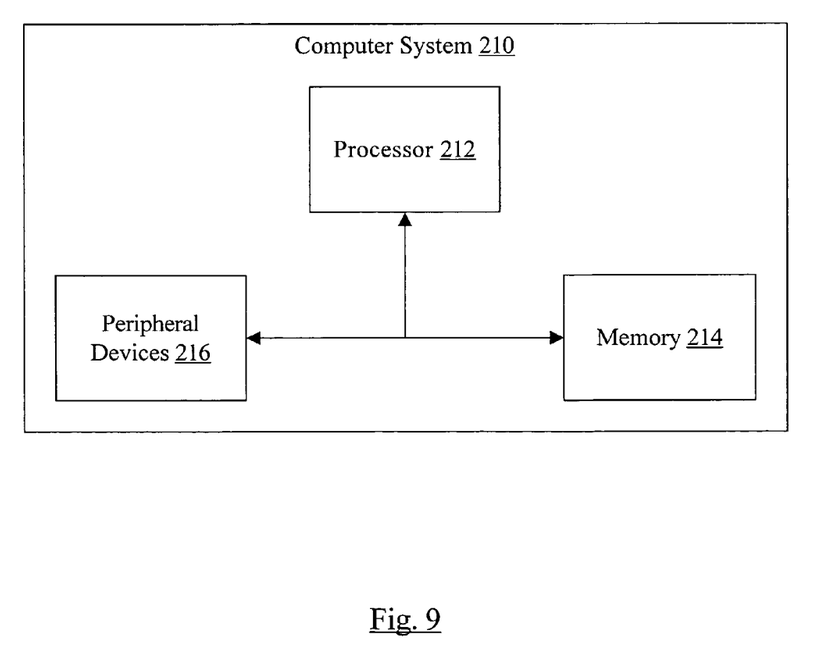
FIG. 9 is a block diagram of one embodiment of a computer system.

It is noted that, while the filesystem 12, the volume manager 14, and the VM client 18 are shown as executing on the computer system 10, other embodiments may execute the filesystem 12, the volume manager 14, and/or the VM client 18 on other computer systems (e.g. coupled via a network to the computer system 10). In the present embodiment, the filesystem 12, the VM client 18, and the volume manager 14 may each comprise software executable by a computer system such as computer system 10. The computer system 10 may include execution hardware (not shown in FIG. 1) to execute the software (e.g. at least one processor designed to execute the instructions forming the software, memory, various peripheral devices, etc.). One embodiment of a computer system is shown in FIG. 9 and described in more detail below. In other embodiments, one or more of the filesystem 12, the VM client 18, and/or the volume manager 14 may be implemented in hardware or a combination of hardware and software.

It is noted that, while FIG. 1 illustrates various storage devices 16A-16D, other embodiments may combine the data stored on two or more storage devices 16A-16D for storage on one storage device. For example, in some embodiments, the log and the volume may be stored on the same storage device. Such a combination may result in a degradation in performance due to contention between the logging of writes and accessing the volume, but may be implemented in some cases. For example, a solid state disk may not have seek/rotational latency costs, and thus may store both the log and the volume. A random access memory (RAM) disk may also be used to reduce the performance problem, although availability characteristics of RAM disks may be an issue in some systems. Similarly, the volume and the snapshots may be stored on the same storage device, if desired. Furthermore, the volume 1 shown on the storage device 16B in FIG. 1 may span more than one storage device, as desired.

As used herein, a volume may be any logically defined group of physical storage that is managed by the volume manager as a unit. A volume may include a portion of the storage on one storage device, a portion of the storage on multiple storage devices, the total amount of storage on one storage device, or the total amount of storage on multiple storage devices, as desired. As mentioned previously, volumes may have various attributes as well, such as mirroring, striping, RAID, etc. The log and the snapshots may also be volumes, in one embodiment.

The present discussion refers to the volume manager 14 performing various operations (e.g. logging of block write operations, generation of snapshots, recovery to a requested point in time, etc.). However, other embodiments may implement separate software performing each operation, or subsets of the operations, as desired.

Figure 2:
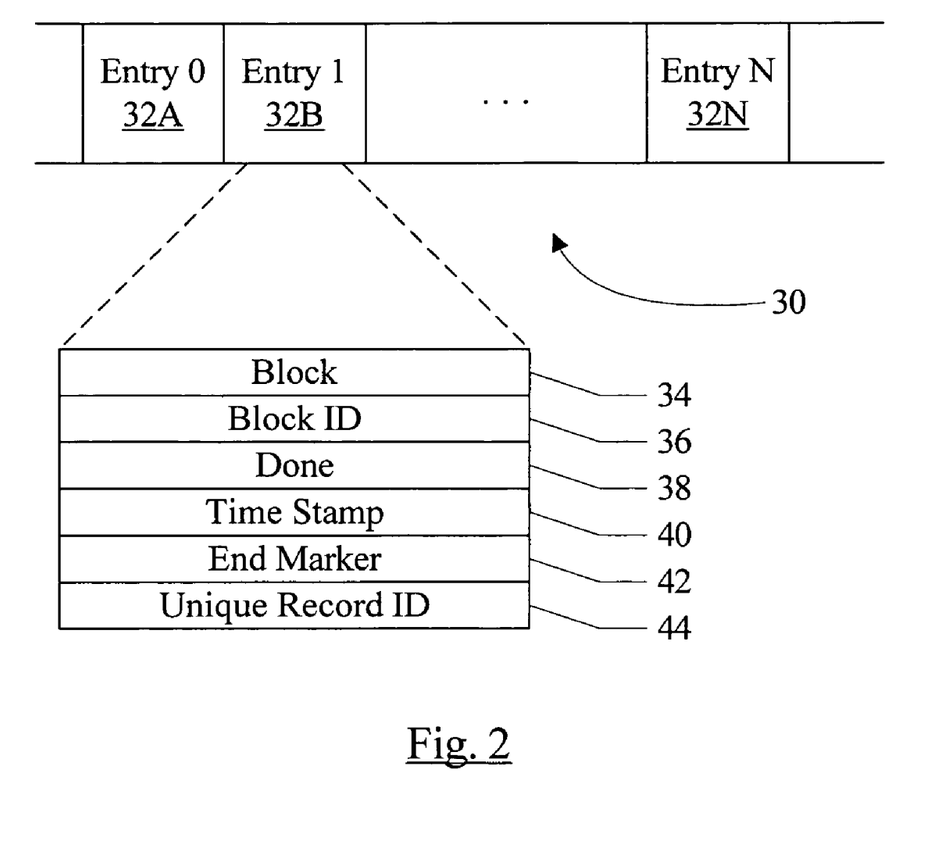
FIG. 2 is a block diagram of one embodiment of a log.

Turning now to FIG. 2, a block diagram illustrating one embodiment of a log 30 for logging block write operations is shown. Generally, a log may comprise any mechanism for recording events and associating an order with them (e.g. a temporal order, in this embodiment).

In the embodiment of FIG. 2, the log 30 comprises a plurality of entries 32A-32N. Each entry 32A-32N may store information corresponding to a different block write operation. That is, a given entry 32A-32N of the log 30 may represent a block write operation. For example, entry 32B is shown in exploded view in FIG. 2, for one embodiment. Other entries in the log 30 may be similar.

In the illustrated embodiment, the entry 32B includes the block 34 of write data, the block ID 36 identifying the location of the block in the volume, a done indication 38, a time stamp 40, the end marker 42, and a unique record ID 44. The block 34, the block ID 36, and the end marker 42 may each be copied from the block write operation. In some cases, the volume manager 14 may maintain separate logs for each volume. In other cases, the log 30 may be shared among two or more volumes, and each log entry 32A-32N may include the volume ID as well. In some embodiments, the log entry may further include an identification of the destination device of the write operation and an offset for the device of the block being written. In some embodiments, each log entry also may include a unique ID 44 to allow fine-grained identification of records. In some embodiments this ID 44 may be a numerically computed sequence number, while in other embodiments this ID may be a globally unique identifier (GUID) that doesn't convey logical entry sequencing information but can be inexpensively computed and be used to uniquely identify each log entry. The done indication 38 and the time stamp 40 are described in more detail below.

The done indication 38 may be used to indicate whether or not the block has been written to the volume. Generally, the done indication may be used by the background process that writes blocks to the volume, to select which blocks from the log 30 are to be written at any given time. That is, the background process may select a log entry for which the done indication is in a state indicating that the block has not been written, write the block to the volume, and change the state of the done indication to indicate that the block has been written to the volume. For example, the done indication may be a flag indicating written to the volume when set and not written when clear, or vice versa. In some embodiments, the done indication for a particular block may be stored in the log 30 as a separate entry. In other embodiments, the done indication for a particular block may be stored in a dedicated data structure persistently stored on its own storage device. In yet other embodiments the done indication may be stored with the logged write information. These and other mechanisms are chosen based on the characteristics of the storage devices being used in the embodiment. The unique record ID 44 may, in some embodiments, be used link the done indication in the separate storage to the log entry.

The time stamp 40 may be any indication of the time at which the write occurs. For example, the time stamp 40 may be generated from the real time facility on the computer system 10. In other embodiments, the time stamp 40 may be a logical measure of time, not directly correlated to the passage of real time. For example, the time stamp 40 may be a lamport logical clock (LLC) measurement. However the time stamp 40 is generated, the time corresponding to the various snapshots and the requested time for a recovery may be measured in a similar fashion to permit comparison with the time stamps.

In other embodiments, the log entries 32A-32N may include any additional desired information, any subset of the entry 32B, and/or any subset and other desired information. For example, in some embodiments, the blocks of write data 34 may be stored separate from the log 30. Additional information that may be included in various embodiments of the log entries 32A-32N, for example, may be one or more of: an indication of whether or not the block has been backed up (e.g. to tape or other computer accessible media), a checksum computed over the block of data, and identifier (e.g. system identifier) of the source of the block write, etc. That is, in some embodiments, more information that that shown in FIG. 2 may be included in each log entry 32A-32N and/or in separate entries using the unique record ID described above.

Figure 3:
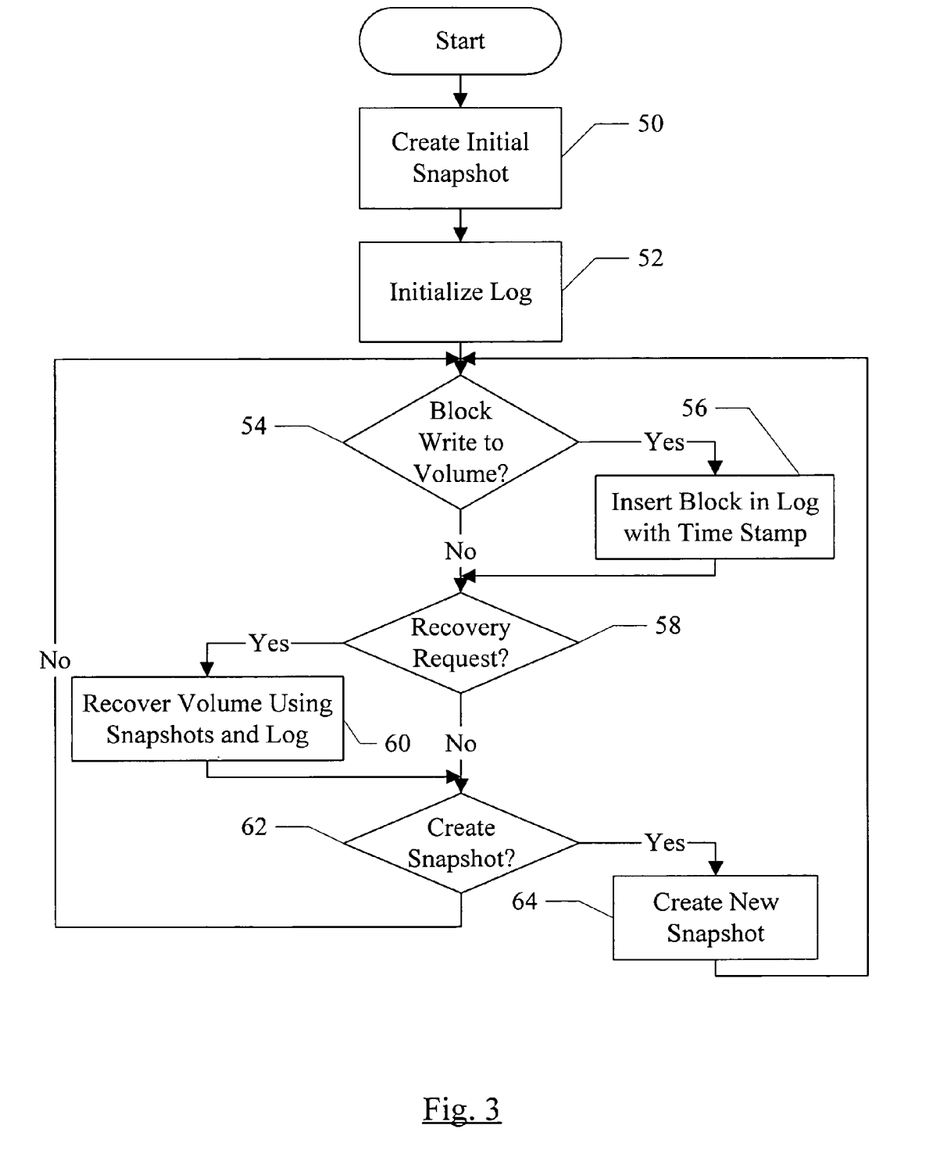
FIG. 3 is a flowchart illustrating operation of one embodiment of a volume manager for snapshotting and write logging to a volume.

Turning next to FIG. 3, a flowchart is shown illustrating various aspects of operation of one embodiment of the volume manager 14. The volume manager 14 may comprise instructions which, when executed, implement the operation of FIG. 3.

At startup, the volume manager 14 may create an initial snapshot of each volume (block 50), and may initialize the log 30 for each volume (block 52). That is, the log 30 may be empty initially.

If the volume manager 14 receives a block write operation to a volume (decision block 54, "yes" branch), the volume manager 14 inserts the block of write data (and other block write operation information, as defined for a given embodiment) in the log 30 along with a time stamp representing the time at which the block write operation occurred (block 56).

If the volume manager 14 receives a recovery request (decision block 58, "yes" branch), the volume manager 14 recovers the volume using the snapshots and the log (block 60). Various embodiments are described in more detail below with respect to FIGS. 5 and 6. The recovery request may be received from any source. For example, the request may be provided through the filesystem 12 or the VM client 18, if either of these becomes aware of a need to recover. An administrator may introduce the recovery request (e.g. via a console interface or other direct interface to the volume manager 14). The recovery request may identify, e.g., the volume to be recovered and the point in time at which the recovery is desired. In some embodiments, the recovery may be performed to the requested point in time (using the most recent snapshot that is previous to the requested point in time and the block write operations from the log 30 that occur between the point in time corresponding to the most recent snapshot and the requested point in time). In other embodiments that implement the end marker, the recovery may be to a second point in time near the requested point in time and corresponding to a block write operation having the end marker indicating the completion of a logical group of writes.

The volume manager 14 (or an external entity that calls the volume manager 14) may determine if a new snapshot is to be created (decision block 62). In various embodiments, the volume manager 14 my create a new snapshot based on different criteria. For example, the volume manager 14 may create a new snapshot at specified time intervals (e.g. once an hour, once every 10 minutes, once a day, etc.). In other embodiments, the volume manager 14 may create a new snapshot based on the write activity to the volume (e.g. based on the size of the log 30, the number of block writes represented in the log 30, etc.). In yet other embodiments, the snapshot may be created on important transactional or event boundaries (e.g. when an important data change takes place or after some number of transactions are committed). Still other embodiments may used a combination of the above techniques. Which techniques to use, and the frequency, may be tunable, in some embodiments. Any other criteria for deciding that a new snapshot is desired may be used. Generally, by creating additional snapshots over time, the time to recover to a given point in time or to a given event may be somewhat bounded since a recent snapshot may frequently be available. Additionally, older snapshots may be discarded at some point and the log entries for block write operations between the discarded snapshots and the oldest non-discarded snapshot may be freed for reuse. In some embodiments, older snapshots may be logically combined to create a composite snapshot of coarser granularity (e.g. older 10 minute snapshots may be combined into composite hourly snapshots, replacing every six 10 minute snapshots with one hourly granularity snapshot). If a new snapshot is to be created (decision block 62, "yes" branch), the volume manager 14 creates the snapshot (block 64).

It is noted that the events represented by decision blocks 54, 58, and 62 may occur at any time and in any order or in parallel in various embodiments. The order in the flowchart of FIG. 3 is not intended to indicate any ordering between the events, but merely to show various operations that the volume manager 14 may perform in the present embodiment. For example, block 54 may be triggered in response to a block write operation on the API. Block 58 may be triggered in response to receiving a recovery request (e.g. on the API, or via any other communication mechanism with the volume manager 14). Block 62 may be triggered in response to a time interval expiring, or the size of the log growing beyond a specified threshold.

Figure 4:
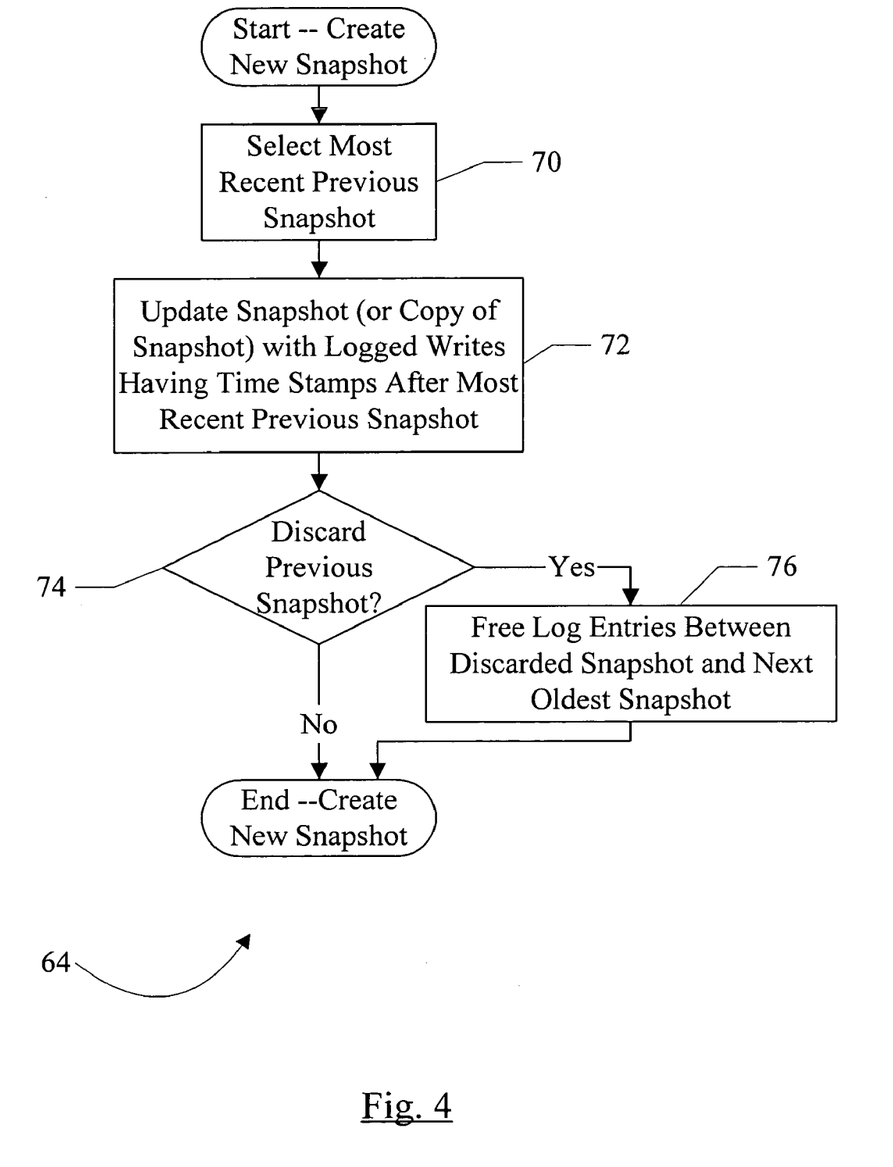
FIG. 4 is a flowchart illustrating operation of one embodiment of a volume manager for generating a new snapshot.

Turning now to FIG. 4, a flowchart illustrating operation of one embodiment of the volume manager 14 for creating a new snapshot (block 64 in FIG. 3) is shown. The volume manager 14 may comprise instructions which, when executed, implement the operation of FIG. 4.

The volume manager 14 may select the most recent previous snapshot (block 70). If the volume manager 14 retains multiple previous snapshots for recovery, the volume manager may make a copy of the most recent previous snapshot. Alternatively, if only one snapshot is retained for recovery, the volume manager 14 need not create a copy of the most recent previous snapshot. The volume manager 14 may update the snapshot (or the copy) by scanning the log 30 and updating the snapshot with each block write operation represented in the log 30 that has a time stamp later than the time corresponding to the most recent previous snapshot (block 72). The volume manager 14 may store the newly created snapshot (e.g. on the storage device 16C in the embodiment of FIG. 1). In other embodiments, the volume manager 14 may make the snapshot in a conventional manner (by snapshotting the state of the volume directly, rather than updating the previous snapshot, or copy, with the block write operations from the log 30).

The volume manager 14 may also determine if a previous snapshot is to be discarded (decision block 74). Various embodiments may retain one or more previous snapshots, as desired. In some embodiments, the number of snapshots to maintain and the frequency of snapshots may be programmable. For example, in one embodiment, snapshots may be made every hour and snapshots may be retained for 12 hours, permitting recovery of the volume to an arbitrary point in time within the last 12 hours. When a new snapshot is made, the snapshot from 13 hours ago is discarded in this example. Any other frequency of snapshotting and amount of snapshot retention may be used in other embodiments.

If a snapshot is discarded (decision block 74, "yes" branch), then log entries having time stamps between the time corresponding to the discarded snapshot and the time corresponding to the oldest snapshot that is being retained are no longer needed (assuming the done indication indicates that they have been committed to the volume). The volume manager 14 may free the identified log entries for reuse (block 76).

It is noted that, in some embodiments, one or more snapshots may be retained as a backup. For example, the last snapshot on a given day may be retained as a backup of the volume for that day. In such cases, the snapshot to be retained may be moved to a backup media.

Figure 5:
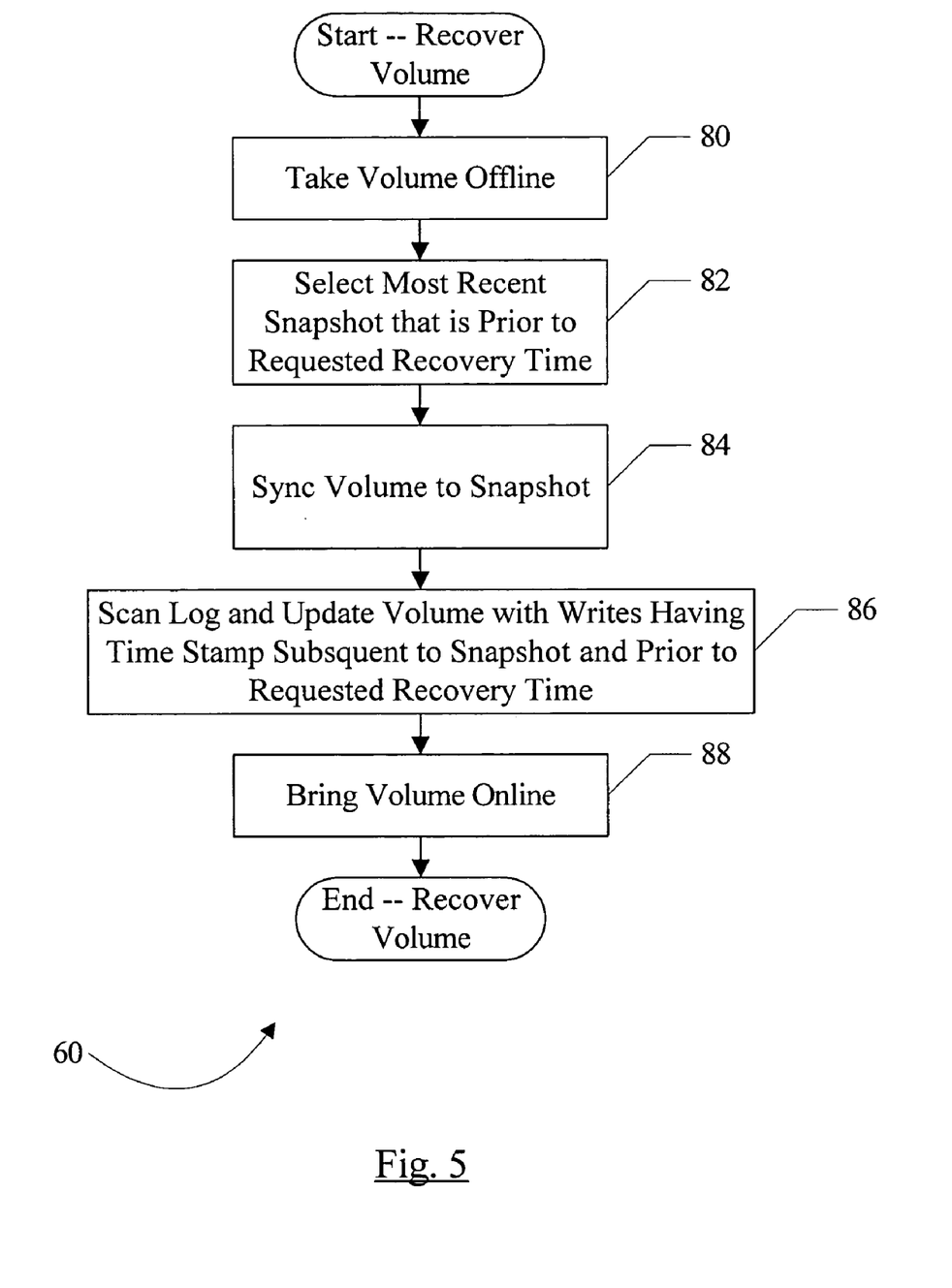
FIG. 5 is a flowchart illustrating operation of one embodiment of a volume manager to recover a volume.

Turning next to FIG. 5, a flowchart illustrating operation of one embodiment of the volume manager 14 for recovering a volume (block 60 in FIG. 3) is shown. The volume manager 14 may comprise instructions which, when executed, implement the operation of FIG. 5.

The volume manager 14 may take the volume offline for the recovery operation (block 80). The volume manager 14 may select the most recent snapshot that is prior to the requested recovery time (the "most recent previous snapshot") (block 82) and may sync the volume to the snapshot (block 84). As used herein, syncing a volume to a snapshot refers to establishing the same state on the volume as is represented by the snapshot. That is, each block in the volume may have the same state as the corresponding block in the snapshot after the sync. Syncing may comprise copying each block from the snapshot to the volume. Alternatively, syncing may comprise copying the blocks that differ (e.g. if the blocks that have changed are noted in the snapshot in some fashion).

The volume manager 14 may scan the log 30 and update the volume to reflect the block write operations that have time stamps subsequent to the time stamp of the snapshot and prior to the requested recovery time (block 86). In some embodiments, log entry IDs may be used instead of or in addition to the time stamps. The volume manager 14 may then bring the volume back online (block 88).

Figure 6:
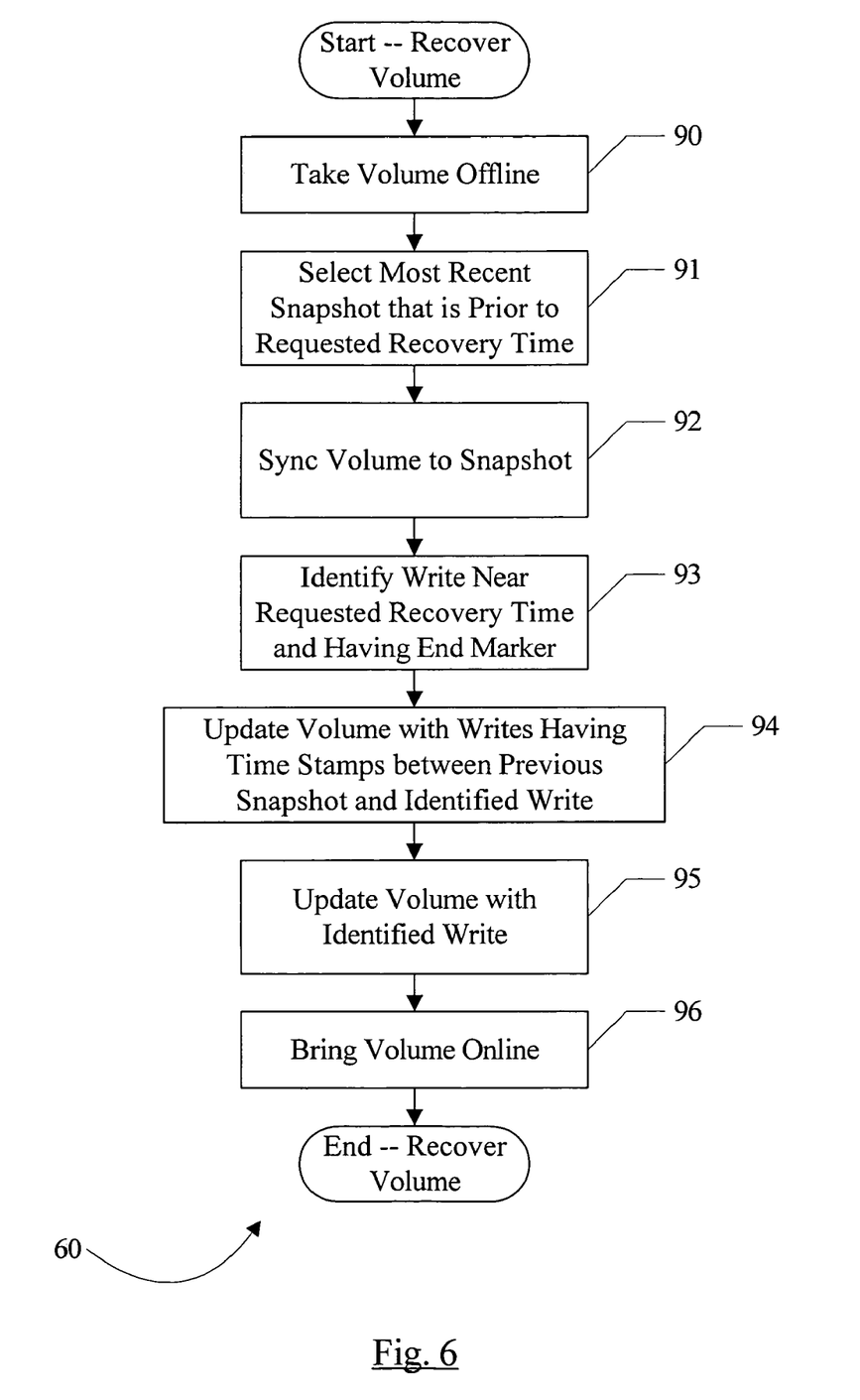
FIG. 6 is a flowchart illustrating operation of another embodiment of a volume manager to recover a volume.

The embodiment of FIG. 5 may be used, e.g., if the end markers are not used. FIG. 6 is a flowchart illustrating operation of one embodiment of the volume manager 14 for recovering a volume (block 60 in FIG. 3) that uses the end markers. The volume manager 14 may comprise instructions which, when executed, implement the operation of FIG. 6.

Similar to the embodiment of FIG. 5, the volume manager 14 may take the volume offline (block 90, similar to block 80 in FIG. 5), select the most recent previous snapshot (block 91, similar to block 82 in FIG. 5), and sync the volume to the selected snapshot (block 92, similar to block 84 in FIG. 5). The volume manager 14 may then identify the block write operation in the log 30 that is near the requested recovery time (that is, that has a time stamp near the requested recovery time) and which has the end marker indicating that the block write operation completes a logical set of writes (block 93). Various embodiments may choose the write operation in different ways. For example, in some embodiments, the volume manager 14 may select the nearest block write operation to the requested recovery time that is also prior to the requested recovery time. Such an embodiment may recover the volume to a state that corresponds to a time prior to or equal to the requested recovery time. Other embodiments may select the nearest block write operation to the requested recovery time that is also subsequent to the requested recovery time. Such an embodiment may recover the volume to a state that corresponds to a time equal to or subsequent to the requested recovery time. In still other embodiments, the volume manager 14 may select the nearest block write operation to the requested recovery time independent of whether the nearest block write operation is prior to or subsequent to the requested recovery time.

The volume manager 14 may scan the log 30 and update the volume to reflect the block write operations that have time stamps subsequent to the time stamp of the snapshot and prior to the time stamp of the block write operation identified as "near" the requested recovery time (block 94). The volume manager 14 may also update the volume with the identified block write operation (block 95). Block 95 may be part of the operation of block 94, and is merely included for completeness in FIG. 6. The volume manager 14 may then bring the volume back online (block 96, similar to block 88 in FIG. 5).

Figure 7:
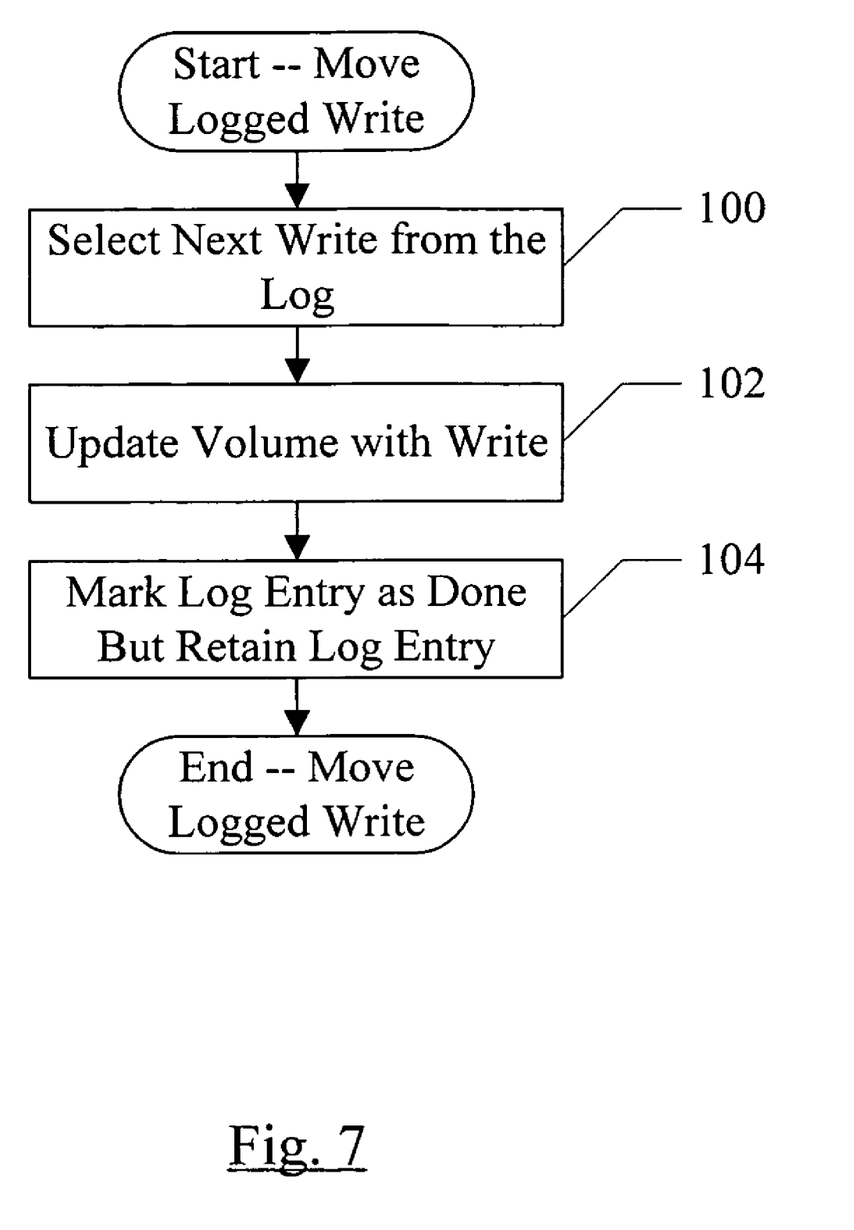
FIG. 7 is a flowchart illustrating operation of one embodiment of a volume manager to move a logged write into the volume.

Turning next to FIG. 7, a flowchart illustrating operation of one embodiment of the volume manager 14 for moving a logged write from the log 30 to the volume is shown. The volume manager 14 may comprise instructions which, when executed, implement the operation of FIG. 7.

The volume manager 14 may select the next block write operation from the log 30 (block 100). The next block write operation may be the oldest block write operation (by time stamp) in the log 30 that has a done indication indicating that the block write operation has not updated the volume. The volume manager 14 may update the volume to reflect the block write operation (block 102) and may mark the volume as done (that is, change the state of the done indication— block 104). The volume manager 14 may retain the log entry, however, for potential recovery of the volume responsive to a recovery request.

It is noted that, while the above embodiments describe logging block write operations and using snapshots and logged block write operations to recover a state of the volume, other embodiments may log any sized write operations. For example, other embodiments may log byte write operations, extent write operations, object write operations, or file-level write operations.

Figure 8:
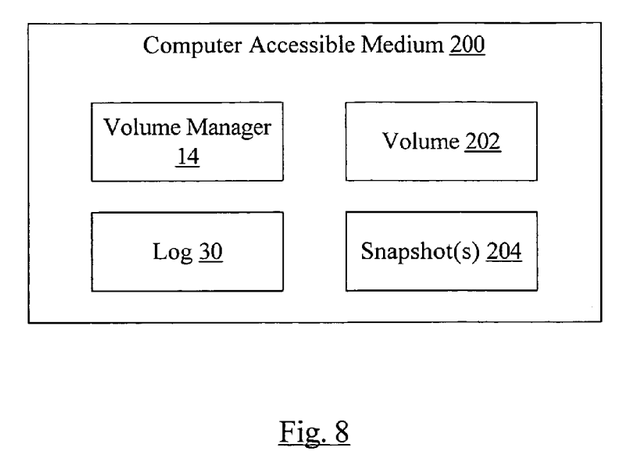
FIG. 8 is a block diagram of one embodiment of a computer accessible medium.

Turning now to FIG. 8, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), as well as media accessible via transmission media or signals such as electrical, electromagnetic, or digital signals, conveyed via a communication medium such as a network and/or a wireless link. The computer accessible medium 200 in FIG. 8 may be store one or more of the volume manager 14, the volume 202, the log 30, and the snapshots 204. The volume manager 14 may comprise instructions which, when executed, implement the operation described herein for the volume manager 14. Generally, the computer accessible medium 200 may store any set of instructions which, when executed, implement a portion or all of the flowcharts shown in one or more of FIGS. 3-7. In still other embodiments, the computer accessible medium 200 may store the filesystem 12 and/or the VM client 18.

FIG. 9 is a block diagram of one embodiment of an exemplary computer system 210. In the embodiment of FIG. 9, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.). In some embodiments, multiple computer systems may be used in a cluster.

Numerous variations and modifications will become apparent to those skilled in the art once the above disclosure is fully appreciated. It is intended that the following claims be interpreted to embrace all such variations and modifications.

What is claimed is:

1. A method comprising:
creating a copy of a volume, the copy corresponding to a first point in time;
logging write operations to the volume in a log separate from the volume;
recovering a state of the volume to a second point in time subsequent to the first point in time using the copy of the volume from the first point in time and at least a subset of the write operations from the log, the subset of write operations occurring subsequent to the first point in time and prior to the second point in time, and wherein the write operations are block write operations;
wherein each write operation includes an end indication indicative of whether or not the write operation completes a logical group of write operations, and wherein the method further comprises:
receiving a request to recover the state of the volume, the request indicating a third point in time; and
locating the second point in time corresponding to a first write operation of the subset, the first write operation having the end indication indicating that the first write operation completes the logical group of write operations, the locating responsive to the third point in time and the third point in time differing from the second point in time.

2. A method comprising:

creating a copy of a volume, the copy corresponding to a first point in time;

logging write operations to the volume in a log separate from the volume, wherein the write operations are written from the log to the volume independent of the write operations being logged;

selecting a first write operation from the log, wherein a done indication associated with a log entry storing the first write operation indicates that the first write operation has not updated the volume;

updating the volume responsive to the first write operation;

marking an entry of the first write operation in the log as done by changing the done indication responsive to updating the volume;

retaining the first write operation in the log subsequent to marking the entry, wherein the done indication identifies the first write operation as having updated the volume, but the first write operation is retained in the log for potential recovery of the volume; and recovering a state of the volume to a second point in time subsequent to the first point in time using the copy of the volume from the first point in time and at least a subset of the write operations from the log, the subset of write operations occurring subsequent to the first point in time and prior to the second point in time.

3. The method as recited in claim 2 further comprising receiving a request to recover the state of the volume, the request indicating the second point in time.

4. The method as recited in claim 2 wherein the logging comprises assigning a time stamp to each write operation, and wherein the recovering comprises identifying the subset of the write operations using the time stamps.

5. The method as recited in claim 2 wherein the recovering comprises syncing the volume to the copy and updating the volume responsive to the subset of the write operations.

6. The method as recited in claim 2 further comprising creating another copy of the volume corresponding to a third point in time.

7. The method as recited in claim 6 further comprising selecting a most recent copy of the volume responsive to the second point in time.

8. The method as recited in claim 6 wherein the third point in time is subsequent to the first point in time, and wherein the another copy comprises a combination of the copy and the write operations from the log.

9. The method as recited in claim 2 wherein the logging comprises assigning a globally unique identifier to each write operation, and wherein the recovering comprises identifying the subset of the write operations using the globally unique identifiers.

10. The method as recited in claim 2 wherein the logging comprises storing, with each write operation, information sufficient to reconstruct the intended destination of the write, this information further comprising the identity of the destination device of the write operation and the offset of the block being written in the destination device.

11. The method as recited in claim 2 further comprising flushing one or more write operations from the log to a second storage device different from one or more storage devices that store the volume and the log.

12. The method as recited in claim 2 further comprising:

creating a plurality of copies of the volume, each copy corresponding to a different point in time;

selecting a first copy of the volume to be discarded; and merging the first copy with a second copy of the volume corresponding to a point in time that is nearest the point in time corresponding to the first copy.

13. The method as recited in claim 2 further comprising:

creating a second copy of the volume, the second copy corresponding to a second point in time;

discarding the copy of the volume corresponding to the first point in time; and deleting one or more write operations from the log that occur between the first point in time and the second point in time, if the one or more write operations are marked as done in the log.

14. A computer accessible storage medium comprising a plurality of instructions which, when executed, implement a method comprising:

creating a copy of a volume, the copy corresponding to a first point in time;

logging write operations to the volume in a log separate from the volume;

recovering a state of the volume to a second point in time subsequent to the first point in time using the copy of the volume from the first point in time and at least a subset of the write operations from the log, the subset of write operations occurring subsequent to the first point in time and prior to the second point in time, and wherein the write operations are block write operations;

wherein each write operation includes an end indication indicative of whether or not the write operation completes a logical group of write operations, and wherein the method further comprises:

receiving a request to recover the state of the volume, the request indicating a third point in time; and locating the second point in time corresponding to a first write operation of the subset, the first write operation having the end indication indicating that the first write operation completes the logical group of write operations, the locating responsive to the third point in time and the third point in time differing from the second point in time.

15. A computer accessible storage medium comprising a plurality of instructions which, when executed, implement a method comprising:

creating a copy of a volume, the copy corresponding to a first point in time;

logging write operations to the volume in a log separate from the volume, wherein the write operations are written from the log to the volume independent of the write operations being logged;

selecting a first write operation from the log, wherein a done indication associated with a log entry storing the first write operation indicates that the first write operation has not updated the volume;

updating the volume responsive to the first write operation;

marking an entry of the first write operation in the log as done by changing the done indication responsive to updating the volume;

retaining the first write operation in the log subsequent to marking the entry, wherein the done indication identifies the first write operation as having updated the volume, but the first write operation is retained in the log for potential recovery of the volume; and recovering a state of the volume to a second point in time subsequent to the first point in time using the copy of the volume from the first point in time and at least a subset of the write operations from the log, the subset of write operations occurring subsequent to the first point in time and prior to the second point in time.

16. The computer accessible storage medium as recited in claim 15 wherein the method further comprises receiving a request to recover the state of the volume, the request indicating the second point in time.

17. The computer accessible storage medium as recited in claim 15 wherein the logging comprises assigning a time stamp to each write operation, and wherein the recovering comprises identifying the subset of the write operations using the time stamps.

18. The computer accessible storage medium as recited in claim 15 wherein the recovering comprises syncing the volume to the copy and updating the volume responsive to the subset of the write operations.

19. The computer accessible storage medium as recited in claim 15 wherein the method further comprises creating another copy of the volume corresponding to a third point in time.

20. The computer accessible storage medium as recited in claim 19 wherein the method further comprises selecting a most recent copy of the volume responsive to the second point in time.

21. The computer accessible storage medium as recited in claim 19 wherein the third point in time is subsequent to the first point in time, and wherein the another copy comprises a combination of the copy and the write operations from the log.

22. The computer accessible storage medium as recited in claim 15 wherein the logging comprises assigning a globally unique identifier to each write operation, and wherein the recovering comprises identifying the subset of the write operations using the globally unique identifiers.

23. The computer accessible storage medium as recited in claim 15 wherein the logging comprises storing, with each write operation, information sufficient to reconstruct the intended destination of the write, this information further comprising the identity of the destination device of the write operation and the offset of the block being written in the destination device.

24. A computer system comprising a computer accessible storage medium as recited in claim 15 and at least one processor configured to execute the plurality of instructions.

25. The computer accessible storage medium as recited in claim 15 wherein the method further comprises flushing one or more write operations from the log to a second storage device different from one or more storage devices that store the volume and the log.

26. The computer accessible storage medium as recited in claim 15 wherein the method further comprises:

creating a plurality of copies of the volume, each copy corresponding to a different point in time;

selecting a first copy of the volume to be discarded; and merging the first copy with a second copy of the volume corresponding to a point in time that is nearest the point in time corresponding to the first copy.

27. The computer accessible storage medium as recited in claim 15 wherein the method further comprises:

creating a second copy of the volume, the second copy corresponding to a second point in time;

discarding the copy of the volume corresponding to the first point in time; and deleting one or more write operations from the log that occur between the first point in time and the second point in time, if the one or more write operations are marked as done in the log.

* * * * *